(12) United States Patent
Weber et al.

(10) Patent No.: US 11,865,925 B2
(45) Date of Patent: Jan. 9, 2024

(54) METHOD FOR OPERATING AN ELECTRIC ENERGY STORE, ELECTRIC ENERGY STORE, AND DEVICE

(71) Applicant: Robert Bosch GmbH, Stuttgart (DE)

(72) Inventors: Jochen Weber, Asperg (DE); Joerg Schneider, Ludwigsburg (DE); Peter Kohn, Stuttgart (DE); Sabine Arnold, Oehningen/Wangen (DE); Thomas Barabas, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 54 days.

(21) Appl. No.: 17/614,197

(22) PCT Filed: Apr. 29, 2020

(86) PCT No.: PCT/EP2020/061918
§ 371 (c)(1),
(2) Date: Nov. 24, 2021

(87) PCT Pub. No.: WO2020/239353
PCT Pub. Date: Dec. 3, 2020

(65) Prior Publication Data
US 2022/0250478 A1    Aug. 11, 2022

(30) Foreign Application Priority Data
May 26, 2019   (DE) ................ 10 2019 207 692.0

(51) Int. Cl.
*B60L 3/00*        (2019.01)
*B60L 58/12*       (2019.01)
*H02J 7/00*        (2006.01)

(52) U.S. Cl.
CPC ............ *B60L 3/0046* (2013.01); *B60L 58/12* (2019.02); *H02J 7/0031* (2013.01);
(Continued)

(58) Field of Classification Search
CPC .. B60L 3/0046; B60L 58/12; B60L 2240/545; B60L 2240/547;
(Continued)

(56) References Cited

U.S. PATENT DOCUMENTS 2,402,695 A     6/1946 Taylor et al.
10,250,055 B2 *  4/2019 Park .................. B60L 58/21
(Continued)

FOREIGN PATENT DOCUMENTS

| CN | 102082310 A | 6/2011 |
| CN | 203103992 U | 7/2013 |
| CN | 103840435 A | 6/2014 |

OTHER PUBLICATIONS

Translation of International Search Report for Application No. PCT/EP2020/061918 dated May 28, 2020 (2 pages).
(Continued)

*Primary Examiner* — Jared Fureman
*Assistant Examiner* — Duc M Pham
(74) *Attorney, Agent, or Firm* — Michael Best & Friedrich LLP

(57) ABSTRACT

The invention relates to a method for operating an electric energy store (1), to an electric energy store (1), and to a device, having an electric energy storage module (18), a switch unit (4), and a first and second connection (5, 7). The method has the following steps which follow one another chronologically: in a first step, a signal of a sensor of the electric energy store (1) is evaluated; in a second step, a critical state of the electric energy store (1) is ascertained; in a third step, an electrically conductive connection between the electric energy storage module (18) and the first and second connection (5, 7) is interrupted in the charge direction by means of the switch unit (4), while simultaneously the electrically conductive connection between the electric (Continued)

energy storage module (18) and the first and second connection (5, 7) remains connected in the discharge direction.

8 Claims, 2 Drawing Sheets

(52) U.S. Cl.
CPC ....... *H02J 7/0047* (2013.01); *B60L 2240/545* (2013.01); *B60L 2240/547* (2013.01); *B60L 2240/549* (2013.01); *B60L 2250/00* (2013.01)

(58) Field of Classification Search
CPC ............ B60L 2240/549; B60L 2250/00; H02J 7/0031; H02J 7/0047
See application file for complete search history.

(56) References Cited

U.S. PATENT DOCUMENTS

| | | |
|---|---|---|
| 2008/0278116 A1 | 11/2008 | Matsunaga et al. |
| 2011/0133571 A1* | 6/2011 | Kiyohara .............. H02J 7/0029 |
| | | 307/130 |
| 2013/0169038 A1 | 7/2013 | King |
| 2016/0156214 A1 | 6/2016 | Yoon et al. |
| 2016/0301224 A1* | 10/2016 | Kim .................... H01M 10/443 |
| 2018/0199421 A1 | 7/2018 | Kim |
| 2018/0316198 A1* | 11/2018 | Niizuma ................. B60L 58/12 |

OTHER PUBLICATIONS

Wikipedia, "Kombiinstrument", <https://de.wikipedia.org/w/index.php?title=Kombiinstrument&oldid=188591103>, last edited Aug. 2020, 6 pages including English translation.

* cited by examiner

METHOD FOR OPERATING AN ELECTRIC ENERGY STORE, ELECTRIC ENERGY STORE, AND DEVICE

BACKGROUND OF THE INVENTION

The present invention relates to a method for operating an electrical energy storage unit, to an electrical energy storage unit and to a device.

US 2013/0169038 A1 discloses a device for the uninterrupted supply of energy to an electric vehicle, consisting of series-connected batteries and comprising a bypass switch.

CN 203103992 U discloses a supervision system for battery charging management and battery discharging management.

SUMMARY OF THE INVENTION

The core concept of the invention in the case of the method for operating an electrical energy storage unit, having an electrical energy storage module, a switching unit and a first and second connection, is that the method comprises the following temporally successive method steps:

in a first method step, a signal from a sensor of the electrical energy storage unit is evaluated, in a second method step, a critical state of the electrical energy storage unit is identified, in a third method step, an electrically conductive connection between the electrical energy storage module and the first and second connection is interrupted in the charging direction by way of the switching unit, while at the same time the electrically conductive connection between the electrical energy storage module and the first and second connection remains connected in the discharging direction.

The background of the invention is that, in the event of the occurrence of a critical state of an electrical energy storage unit, it is normally completely deactivated. A device supplied by the electrical energy storage unit, for example a vehicle, may thereby enter a critical operating state. If, for example during driving, the electrical energy storage unit of the vehicle fails, in addition to an electric drive, safety-relevant apparatuses of the vehicle, such as for example braking assistant, steering assistant and vehicle controller, also fail.

In the method according to the invention, the electrical energy storage unit is advantageously still able to be discharged in a critical state. At the same time, further charging of the electrical energy storage unit, in particular by way of recuperation, is prevented. The device is thereby able to be put into a safe operating state, and at the same time an overcharge state of the defective electrical energy storage unit is prevented.

According to one advantageous refinement, the sensor is a cell voltage sensor, a temperature sensor, a current sensor and/or an output voltage sensor. The respective sensor may be used to identify features of the critical state of the electrical energy storage unit, specifically a critical cell voltage and/or a critical current and/or a critical cell temperature and/or a critical temperature of the electrical energy storage unit.

It is advantageous in this case, in the event of failure of a cell voltage sensor, for the electrical energy storage unit still to be operated in the discharging direction, wherein the electrical energy storage unit is monitored by way of the current sensor. In the event of a critical state of the electrical energy storage unit, the device is thus able to be put into a safe operating state. The electrical energy storage unit is however in this case still monitored by way of the current sensor, such that the electrical energy storage unit is able to be deactivated in the event of the additional occurrence of an overcurrent.

A critical state of the electrical energy storage unit is preferably a measured value from a sensor exceeding a critical maximum limit value or a measured value falling below a critical minimum limit value or a sensor failing or a supervision unit of the electrical energy storage unit at least partially failing. The critical state is thus able to be identified by evaluating a signal from the sensor or through the absence of a signal.

It is also advantageous, in a fourth method step, for a warning notification or a fault message to be output to a user or an external controller. The warning notification or the fault message may be used to initiate adaptation of the operating strategy of the electrical energy storage unit. The loading of the electrical energy storage unit may thereby be reduced. The user preferably receives a notification that he should visit a garage in order to have the electrical energy storage unit repaired.

The core concept of the invention in the case of the electrical energy storage unit, in particular that is able to be operated by way of a method as described above or as claimed in one of the method-related claims, wherein the electrical energy storage unit has an electrical energy storage module, a switching unit and a first and second connection, is that the electrical energy storage unit is designed to simultaneously interrupt an electrically conductive connection between the electrical energy storage module and the first and second connection in the charging direction and to connect it in the discharging direction by way of the switching unit.

The background of the invention is that, in a critical state of the electrical energy storage unit, this does not have to be completely deactivated, but rather is still able to be discharged. At the same time, the interruption in the charging direction prevents any further charging of the electrical energy storage unit, such that overcharging is able to be prevented.

According to one advantageous refinement, the electrical energy storage unit has a supervision unit, a charging controller and a discharging controller. In this case, the charging controller and the discharging controller are able to be controlled and operated independently of one another by the supervision unit.

It is also advantageous for the switching unit to have at least one first switching means and at least one second switching means, in particular a matrix circuit of first switching means and second switching means. The switching unit is thereby able to have a compact form.

It is advantageous in this case for the first switching means to have at least one first MOSFET switch and for the second switching means to have at least one second MOSFET switch.

The core concept of the invention in the case of the device, in particular vehicle, is that the device has an electrical energy storage unit as described above or as claimed in one of the electrical energy storage unit-related claims.

The background of the invention is that the device, in the event of a critical state of the electrical energy storage unit, is able to be put into a safe operating state. By way of example, a vehicle may be parked safely or taken to a garage.

The above refinements and developments may be combined with one another as desired where expedient. Further possible refinements, developments and implementations of the invention also comprise combinations, not explicitly mentioned, of features of the invention that are described above or below with reference to the exemplary embodiments. A person skilled in the art will in particular in this case also add individual aspects to the respective basic form of the present invention in the form of improvements or additions.

BRIEF DESCRIPTION OF THE DRAWINGS

The invention is explained in the following section with reference to exemplary embodiments from which further inventive features may arise, but the invention is not limited to these in terms of its scope. The exemplary embodiments are illustrated in the drawings.

In the figures.

DETAILED DESCRIPTION

Figure 1:
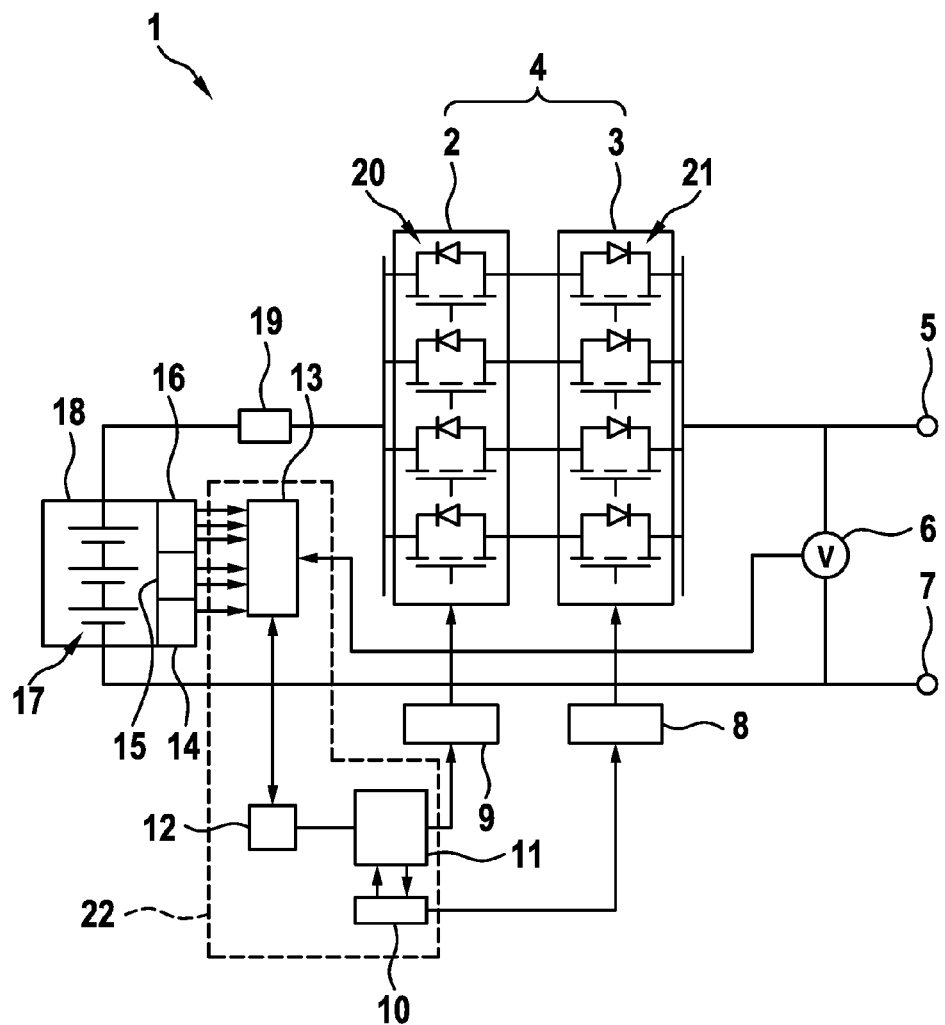
FIG. 1 shows an electrical energy storage unit 1 according to the invention.

The electrical energy storage unit 1 illustrated in FIG. 1 has:
- at least one electrical energy storage module 18,
- a supervision unit 22,
- a switching unit 4,
- a charging controller 8,
- a discharging controller 9,
- a resistor 19,
- a first connection 5,
- a second connection 7 and
- an output voltage sensor 6 that is connected between the first and second connection and is designed to determine the voltage between the first and second connection (5, 7).

The electrical energy storage module 18 has at least one electrical energy storage cell 17 and sensors, in particular at least one cell voltage sensor 16, at least one temperature sensor 15 and a current sensor 14. The electrical energy storage module 18 preferably has a plurality of electrical energy storage cells 17 that are arranged in a series circuit. In this case, each electrical energy storage cell 17 is assigned a cell voltage sensor 16, in particular arranged connected in parallel with the respective electrical energy storage cell 17, and which is designed to determine the voltage of the respective electrical energy storage cell 17. The current sensor 14 is connected in series with the electrical energy storage cells 17 and designed to determine the current flowing through the electrical energy storage cells 17. At least one temperature sensor 15 is arranged in the electrical energy storage module 18. A temperature sensor 15 is preferably arranged on each electrical energy storage cell 17.

The supervision unit 22 has an evaluation unit 13, a transceiver unit 12, a control unit 11 and a monitoring unit 10. The evaluation unit 13 is connected in terms of signaling to the transceiver unit 12. The transceiver unit 12 is connected in terms of signaling to the control unit 11. The control unit 11 is connected in terms of signaling to the monitoring unit 10.

The supervision unit 22 is connected in terms of signaling to the sensors of the electrical energy storage module 18 and the output sensor. The evaluation unit 13 is designed to evaluate signals from the sensors and to transmit a measurement result from the sensors to the transceiver unit 12. The transceiver unit 12 is designed to forward the measurement result to the control unit 11. The control unit 11 is designed to forward the measurement result to the monitoring unit 10. The monitoring unit 10 is designed to monitor the measurement unit 13, the transceiver unit 12 and/or the control unit 11 and to identify a failure of the measurement unit 13, of the transceiver unit 12 and/or of the control unit 11.

The supervision unit 22 is connected in terms of signaling to the charging controller 8 and the discharging controller 9. In this case, the control unit 11 and/or the monitoring unit 10 are designed to control the charging controller 8 and/or the discharging controller 9.

The switching unit 4 has at least one first switching means 2 and at least one second switching means 3, in particular a matrix of first switching means 2 and second switching means 3, by way of which the electrical energy storage module 18 is able to be electrically conductively connected to the first and second connection (5, 7). In this case, the first switching means 2 is designed to connect the electrical energy storage module 18 to the first and second connection (5, 7) for charging or to disconnect the connection. The second switching means 3 is designed to connect the electrical energy storage module 18 to the first and second connection (5, 7) for discharging or to disconnect the connection. The first switching means 2 is preferably in the form of a first MOSFET 20 and the second switching means 3 is preferably in the form of a second MOSFET 21.

The charging controller 8 is connected in terms of signaling to the second switching means 3 and designed to actuate the second switching means 3. The discharging controller 9 is connected in terms of signaling to the first switching means 2 and designed to actuate the first switching means 2.

A resistor 19 is arranged between the switching unit 4 and the electrical energy storage module 18. It is possible to determine the current flowing through the switching unit 4 by way of the resistor 19.

The supervision unit 22 monitors and controls the electrical energy storage unit 1. To this end, the signals from the sensors of the electrical energy storage module 18 are evaluated and monitored. As soon as the electrical energy storage unit 1 has a critical state, for example a measured value exceeds a critical maximum limit value or falls below a critical minimum limit value or a sensor fails, the charging controller 8 and/or the discharging controller 9 may be actuated in order to protect the electrical energy storage unit 1. In this case, the charging controller 8 may prohibit charging processes, while the discharging controller 9 still permits discharging processes. In the same way, charging processes and discharging processes may be simultaneously prohibited or charging processes are permitted and discharging processes are prohibited. Charging processes and discharging processes may thus be controlled independently of one another.

According to a further exemplary embodiment not illustrated in the figures, the supervision unit 22 is connected in terms of signaling to a vehicle controller of an electrically driven vehicle. In this case, the supervision unit 22 is designed to actuate the electrical energy storage unit 1 in accordance with the vehicle control commands from the vehicle controller. The supervision unit 22 is furthermore designed to transmit a fault message from the electrical energy storage unit 1 to the vehicle controller. A driving speed or range of the vehicle may thus for example be limited or a fault message may be displayed when the electrical energy storage unit 1 has a critical state.

Figure 2:
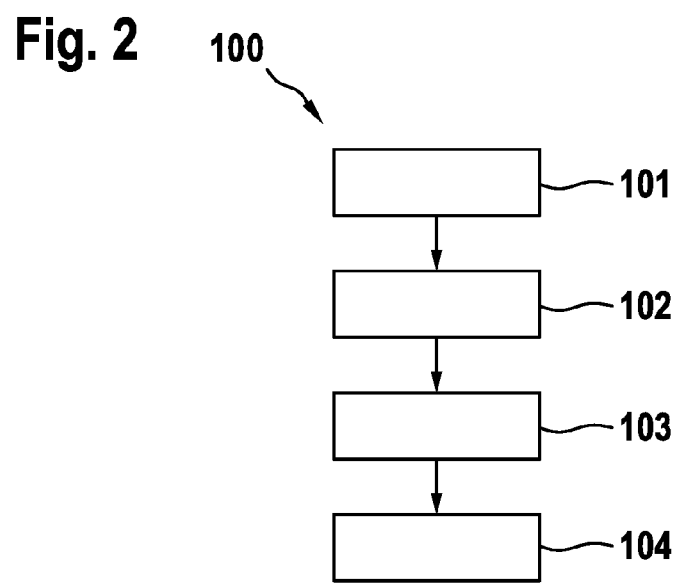
FIG. 2 shows a schematic flowchart of a method 100 according to the invention for operating an electrical energy storage unit 1.

FIG. 2 schematically illustrates the method 100 according to the invention for operating an electrical energy storage unit 1 having an electrical energy storage module 18, a switching unit 4 and a first and second connection (5, 7). The method 100 comprises the following temporally successive method steps:

In a first method step 101, a signal from a sensor of the electrical energy storage unit 1 is evaluated. The sensor is a cell voltage sensor 16 and/or a temperature sensor 15 and/or a current sensor 14 and/or an output voltage sensor 6.

In a second method step 102, a critical state of the electrical energy storage unit 1 is identified. A critical state of the electrical energy storage unit 1 is for example a measured value from a sensor exceeding a critical maximum limit value or falling below a critical minimum limit value or a sensor failing.

In a third method step 103, an electrically conductive connection between the electrical energy storage module 18 and the first and second connection (5, 7) is interrupted in the charging direction by way of the switching unit 4, while the electrically conductive connection between the electrical energy storage module 18 and the first and second connection (5, 7) remains connected in the discharging direction. The electrical energy storage unit (1) may thus still be discharged, but no longer be charged.

In a fourth method step 104, a warning notification or a fault message is output to a user or an external controller.

The critical state of the electrical energy storage unit 1 is preferably not allowed to exceed a predefined critical time interval. If this critical time interval is exceeded, the electrically conductive connection between the electrical energy storage module 18 and the first and second connection (5, 7) is interrupted in the charging direction and in the discharging direction.

An electrical energy storage unit is in this case understood to mean a rechargeable energy storage unit, in particular having an electrochemical energy storage cell and/or an energy storage module having at least one electrochemical energy storage cell and/or an energy storage pack having at least one energy storage module. The energy storage cell may be in the form of a lithium-based battery cell, in particular lithium-ion battery cell. As an alternative, the energy storage cell is in the form of a lithium-polymer battery cell or nickel metal hydride battery cell or lead-acid battery cell or lithium-air battery cell or lithium-sulfur battery cell.

The invention claimed is:

1. A method (100) for operating an electrical energy storage unit (1), having an electrical energy storage module (18), a switching unit (4), and a first and second connection (5, 7), the method (100) comprising the following temporally successive method steps:
    evaluating, in a first method step (101), a signal from a sensor of the electrical energy storage unit (1),
    identifying, in a second method step (102), a critical state of the electrical energy storage unit (1), and
    interrupting, in a third method step (103), an electrically conductive connection between the electrical energy storage module (18) and the first and second connection (5, 7) in a charging direction by way of the switching unit (4), while at the same time maintaining the electrically conductive connection between the electrical energy storage module (18) and the first and second connection (5, 7) in a discharging direction,
    wherein the sensor is at least one selected from the group consisting of a cell voltage sensor (16), a temperature sensor (15), a current sensor (14), and an output voltage sensor (6), and
    wherein, in the event of failure of the cell voltage sensor (16), the electrical energy storage unit (1) is operated in the discharging direction and the electrical energy storage unit (1) is monitored by the current sensor (14).

2. The method (100) for operating an electrical energy storage unit (1) as claimed in claim 1, wherein a critical state of the electrical energy storage unit (1) is a measured value from a sensor exceeding a critical maximum limit value, a measured value falling below a critical minimum limit value, or a sensor or a supervision unit (22) of the electrical energy storage unit (1) at least partially failing.

3. The method (100) for operating an electrical energy storage unit (1) as claimed in claim 1, wherein, in a fourth method step (104), a warning notification or a fault message is output to a user or an external controller.

4. An electrical energy storage unit (1), wherein the electrical energy storage unit (1) has an electrical energy storage module (18), a switching unit (4) and a first and second connection (5, 7), and is configured to
    evaluate a signal from a sensor of the electrical energy storage unit (1),
    identify a critical state of the electrical energy storage unit (1), and
    interrupt an electrically conductive connection between an electrical energy storage module (18) and a first and a second connection (5, 7) in a charging direction by way of a switching unit (4), while at the same time maintaining an electrically conductive connection between the electrical energy storage module (18) and the first and second connection (5, 7) in a discharging direction,
    wherein the electrical energy storage unit (1) is further configured to simultaneously interrupt an electrically conductive connection between the electrical energy storage module (18) and the first and second connection (5, 7) in the charging direction and to connect it in the discharging direction by way of the switching unit (4),
    wherein the electrical energy storage unit (1) includes a cell voltage sensor (16) and a current sensor (14), and
    wherein, in the event of failure of the cell voltage sensor (16), the electrical energy storage unit (1) is operated in the discharging direction and the electrical energy storage unit (1) is monitored by the current sensor (14).

5. The electrical energy storage unit (1) as claimed in claim 4, wherein the electrical energy storage unit (1) has a supervision unit (22), a charging controller (8), and a discharging controller (9).

6. The electrical energy storage unit (1) as claimed in claim 4, wherein the switching unit (4) has at least one first switching means (2) and at least one second switching means (3).

7. The electrical energy storage unit (1) as claimed in claim 6, wherein the first switching means (2) has at least one first MOSFET switch (20) and the second switching means (3) has at least one second MOSFET switch (21).

8. A vehicle, comprising an electrical energy storage unit (1), wherein the electrical energy storage unit (1) has an electrical energy storage module (18), a switching unit (4) and a first and second connection (5, 7), and is configured to evaluate a signal from a sensor of the electrical energy storage unit (1), identify a critical state of the electrical energy storage unit (1), and interrupt an electrically conductive connection between an electrical energy storage module (18) and a first and a second connection (5, 7) in a charging direction by way of a switching unit (4), while at the same time maintaining an electrically conductive connection between the electrical energy storage module (18) and the first and second connection (5, 7) in a discharging direction, wherein the electrical energy storage unit (1) is further configured to simultaneously interrupt an electrically conductive connection between the electrical energy storage module (18) and the first and second connection (5, 7) in the charging direction and to connect it in the discharging direction by way of the switching unit (4), wherein the electrical energy storage unit (1) includes a cell voltage sensor (16) and a current sensor (14), and wherein, in the event of failure of the cell voltage sensor (16), the electrical energy storage unit (1) is operated in the discharging direction and the electrical energy storage unit (1) is monitored by the current sensor (14).

\* \* \* \* \*